US012661617B2

(12) United States Patent
Oklejas, Jr.

(10) Patent No.: US 12,661,617 B2
(45) Date of Patent: Jun. 23, 2026

(54) HYBRID ENERGY RECOVERY SYSTEM

(71) Applicant: Fluid Equipment Development Company, LLC, Monroe, MI (US)

(72) Inventor: Eli Oklejas, Jr., Newport, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 37 days.

(21) Appl. No.: 18/836,193

(22) PCT Filed: Feb. 6, 2023

(86) PCT No.: PCT/US2023/012402

§ 371 (c)(1),
(2) Date: Aug. 6, 2024

(87) PCT Pub. No.: WO2023/150343

PCT Pub. Date: Aug. 10, 2023

(65) Prior Publication Data

US 2025/0196066 A1 Jun. 19, 2025

Related U.S. Application Data

(60) Provisional application No. 63/307,285, filed on Feb. 7, 2022.

(51) Int. Cl.
B01D 61/06 (2006.01)
B01D 61/12 (2006.01)
F04B 43/06 (2006.01)

(52) U.S. Cl.
CPC ............. B01D 61/06 (2013.01); B01D 61/12 (2013.01); F04B 43/06 (2013.01); B01D 2313/243 (2013.01); B01D 2313/246 (2013.01); F05B 2220/602 (2013.01)

(58) Field of Classification Search
CPC .. B01D 61/06; B01D 61/12; B01D 2313/243; B01D 2313/246; B01D 2311/16; F04B 43/06; F04B 43/02; F05B 2220/602; F03B 13/00
See application file for complete search history.

(56) References Cited

U.S. PATENT DOCUMENTS

| | | | | |
|---|---|---|---|---|
| 6,139,740 A | * | 10/2000 | Oklejas | ................ B01D 61/026 210/252 |
| 6,187,200 B1 | * | 2/2001 | Yamamura | ............. B01D 61/06 210/652 |
| 8,475,664 B2 | * | 7/2013 | Keyser | ................... C10G 1/047 210/801 |

(Continued)

FOREIGN PATENT DOCUMENTS

| | | | | |
|---|---|---|---|---|
| WO | WO-2020176576 A1 | * | 9/2020 | ............. B01D 61/08 |
| WO | 2020192857 A1 | | 10/2020 | |

OTHER PUBLICATIONS

International Search Report and Written Opinion, Application No. PCT/US2023/012402, dated Jul. 7, 2023.

*Primary Examiner* — Matthew T Largi
(74) *Attorney, Agent, or Firm* — MacMillan, Sobanski & Todd, LLC

(57) ABSTRACT

A system is designed to recover energy from a fluid processing operation that uses membranes to remove impurities from a feed stream. Energy recovery devices, such as turbochargers, an isobaric chamber and a multistage pump are utilized to recover the energy.

6 Claims, 11 Drawing Sheets

(56)　　　　　References Cited

U.S. PATENT DOCUMENTS

| | | | | |
|---|---|---|---|---|
| 9,695,064 | B2 * | 7/2017 | Okeljas, Jr. ............ | B01D 61/06 |
| 10,933,376 | B1 * | 3/2021 | Oklejas, Jr. ............ | B01D 61/06 |
| 2006/0226077 | A1 * | 10/2006 | Stark ......................... | F04F 5/10 |
| | | | | 210/257.2 |
| 2008/0105617 | A1 * | 5/2008 | Oklejas ................. | B01D 61/06 |
| | | | | 210/87 |
| 2010/0192575 | A1 | 8/2010 | Al-Mayahi et al. | |
| 2011/0198290 | A1 * | 8/2011 | Oklejas, Jr. ............ | C02F 1/441 |
| | | | | 210/652 |
| 2011/0309007 | A1 | 12/2011 | Ito et al. | |
| 2019/0092656 | A1 * | 3/2019 | Oklejas, Jr. ............ | B01D 61/12 |
| 2019/0224624 | A1 | 7/2019 | Kitamura et al. | |
| 2019/0299162 | A1 * | 10/2019 | Chen ................... | B01D 61/025 |
| 2021/0178328 | A1 | 6/2021 | Oklejas, Jr. | |

* cited by examiner

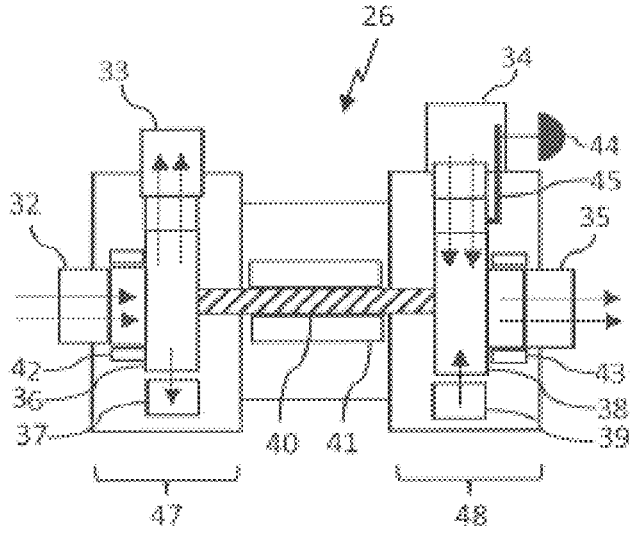
FIG. 2.1
Prior Art
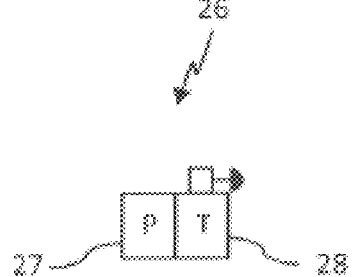
FIG. 2.2
Prior Art

FIG. 7-A
Prior Art

Isobaric Chamber Control

| FM 192 (total permeate) | Action | Comments |
|---|---|---|
| High | Reduce VFD 144 speed reference | • Reduced feed pressure reduces permeate production<br>• Reduced pressure reduces turbo interstage boost |
| Low | Increase VFD 144 speed reference | • Increased feed pressure increases overall production<br>• Increased pressure increases turbo interstage boost |
| FM 193 (2nd membrane permeate) | | |
| High | Open aux nozzle | • Reduce turbo feed boost |
| Low | Close aux nozzle | • Increase turbo feed boost |
| FM 191 (brine to drain) | | |
| High | Close valve 8 | • Reduce brine flow from isobaric chamber |
| Low | Open valve 8 | • Increase brine flow from isobaric chamber |
| FM 190 (feed from IC) | | If pump 110 used |
| High | Reduce VFD 147 speed reference | • Reduces feed flow from IC |
| Low | Increase VFD 147 speed reference | • Increases feed flow from IC |
| FM 190 (feed from IC) | | If control valve 151 used |
| High | Close valve 151 | • Reduces feed flow from IC |
| Low | Open valve 151 | • Increases feed flow from IC |

All control loops are independent and will converge to a stable operation condition

FIG. 14

TurboExchanger Control

| FM 192 (total permeate) | Action | Comments |
|---|---|---|
| High | Reduce VFD 144 speed reference | • Reduced feed pressure reduces permeate production<br>• Reduced pressure reduces turbo interstage boost |
| Low | Increase VFD 144 speed reference | • Increased feed pressure increases overall production<br>• Increased pressure increases turbo interstage boost |
| FM 193 (2nd membrane permeate) | | |
| High | Open aux nozzle | • Reduce turbo feed boost |
| Low | Close aux nozzle | • Increase turbo feed boost |
| FM 191 (brine to drain) | | |
| High | Close aux nozzle | • Reduce brine flow |
| Low | Open aux nozzle | • Increase brine flow |
| FM 190 (feed from Turbo) | | |
| High | Close valve 151 | • Reduces feed flow from turbocharger 21 |
| Low | Open valve 151 | • Increases feed flow from turbocharger 21 |

All control loops are independent and will converge to a stable operation condition

FIG. 15

TurboExchanger control with Motor

| FM 192 (total permeate) | Action | Comments |
|---|---|---|
| High | Reduce VFD 173 speed reference | • Reduced feed pressure reduces permeate production<br>• Reduced pressure reduces turbo interstage boost |
| Low | Increase VFD 173 speed reference | • Increased feed pressure increases overall production<br>• Increased pressure increases turbo interstage boost |
| FM 193 (2ⁿᵈ membrane permeate) | | |
| High | Open aux nozzle | • Reduce turbo feed boost |
| Low | Close aux nozzle | • Increase turbo feed boost |
| FM 191 (brine to drain) | | |
| High | Close aux nozzle | • Reduce brine flow |
| Low | Open aux nozzle | • Increase brine flow |

All control loops are independent and will converge to a stable operation condition

FIG. 16

HYBRID ENERGY RECOVERY SYSTEM

CROSS REFERENCE TO RELATED APPLICATION

The present application is based upon and claims the benefit of U.S. provisional patent application No. 63/307,285, filed on Feb. 7, 2022, which is incorporated herein by reference in its entirety.

BACKGROUND AND PRIOR ART

The reverse osmosis (RO) process uses a set of membrane elements that allow solvent (e.g., water) to pass through the membrane but blocks dissolved solids (e.g., salts). RO is used for desalination of brackish water and seawater where a feed stream is separated into a freshwater stream (called permeate) by the membrane and the balance is rejected as a concentrated brine stream (called concentrate or brine or reject) which exits the membrane at a pressure slightly lower than the feed pressure entering the membrane array. This discussion will focus on desalination however it equally applies to all separation processes with any type of solvent that use membranes.

FIG. 1 shows an RO system consisting of a source of brackish or seawater, called feed, connected to the high-pressure pump (HPP) 2 by pipe 1. The discharge of HPP 2 enters membrane 10 through pipe 4 with flow regulation provided by control valve 3. Permeate exits through pipe 11. Brine exits membrane 10 through pipe 16 to drain 6. Control valve 8 regulates brine flow.

The rate of permeate production, called the flux rate, in the membrane is determined by net driving pressure (NDP) which equals the fluid pressure minus the average osmotic pressure of the feed in the membrane. Osmotic pressure is determined by the concentration of dissolved solids. The feed becomes increasingly concentrated as it passes through the membrane length thus having an increasing osmotic pressure and lower NDP. Therefore, permeate production decreases along the length of the membrane.

The amount of permeate produced divided by the feed amount is called recovery. For example, if 4 m$^3$ of permeate is recovered from 10 m$^3$ of feed, the recovery is 40%. In seawater reverse osmosis (SWRO) systems a set of membranes can recovery up to about 45% while maintaining acceptable energy consumption and quality of permeate.

If higher recovery is desired, prior art membrane arrangement depicted in FIG. 2 is used. Brine exits membrane 10 through pipe 5 and enters pump 7 that raises pressure to restore NPD and then enters second membrane 15. Due to increased NDP supplied by pump 7, additional permeate exits membrane 15 through pipe 12 and collected by permeate header 13. Brine exits membrane 15 through pipe 16 to drain 6. Control valve 8 regulates brine flow.

Energy recovery devices (ERDs) are often used to recover the hydraulic energy in the brine stream exiting the last stage. The ERD relevant to this disclosure are turbochargers and isobaric chambers.

Turbochargers uses the brine hydraulic energy to boost the pressure of another stream, typically the feed entering a membrane stage. Please refer to FIG. 2.1 for a turbocharger designed for high pressure desalination. Turbocharger 26 includes pump section 47 with feed inlet 32, feed outlet 33 and turbine section 48 with brine inlet 34 and brine outlet 35. Pump section includes diffuser 37 that surrounds pump impeller 36 with wear ring 42 and is in fluid communications with feed inlet 32 and feed outlet 33. Turbine section 48 includes nozzle ring or volute 39 that surrounds impeller 38 with wear ring 43 and is in fluid communications with brine inlet 34 and brine outlet 35. Pump and turbine impellers are affixed to shaft 40 which is supported by bearing 41. In operation, high pressure brine enters brine inlet 34, passes through nozzle ring 39 where a high tangential velocity is imparted to the fluid, then enters impeller 38 and imparts torque to shaft 40. Brine exits through brine outlet 35. Feed enters inlet 32, passes through impeller 36 which is rotating in response to shaft torque generated by turbine impeller 38. Feed, now with high tangential velocity, enters diffuser 37 that converts velocity to static pressure. The feed exits through outlet 33.

Valve 44 may be opened to admit addition brine flow to nozzle ring or volute 45 to increase brine flow or to reduce brine flow resistance through turbine section 48. FIG. 2.2 shows a typical Process Symbol for the turbocharger equipped with brine auxiliary nozzle as described in the foregoing.

Please refer to FIG. 3. The depicted system is like FIG. 2 with the addition of turbochargers 21 and 26. Feed from HPP 2 enters pump section 18 of turbocharger 21 that boosts pressure of the feed that then passes through pipe 9 to first membrane 10. High pressure brine exits membrane 10 through pipe 5 into pump section 27 of turbocharger 26 that increases pressure with the flow then entering second membrane 15. Permeate exits membrane 15 through pipe 12 and collected by permeate header 13. Brine exits membrane 15 through pipe 16 to turbine section 28 of turbocharger 26. Hydraulic energy is recovered and used to power pump section 27. The partially depressurized brine passes through pipe 29 to turbine section of 20 of turbocharger 21 to energize pump section 18. Brine exits turbine section 20 through pipe 17 to drain 6.

Prior Art depicted in FIG. 3 is the preferred method to obtain increased recovery when designing a new facility. Increasing the recovery of an RO system improves the economic performance of the system. However, there are many hundreds of RO systems that are single stage system with limited recovery. If the cost of replacing existing HPP and ERDs is judged too expensive, then means are needed to add a second stage for higher recovery while retaining as much of the existing system components as possible to reduce the total cost of the retrofit.

An isobaric chamber pressurizes a feed flow equal to the brine flow and discharges the feed at a pressure slightly less than the entering brine flow. Thus, an isobaric chamber acts as a high-pressure pump that pressurizes a feed flow equal to the brine flow. A separate high-pressure pump pressurizes a feed flow equal to the permeate flow. An additional pump is needed to raise the feed discharge of the isobaric chamber to compensate for pressure losses by 2 to 4 bar to match the membrane pressure.

FIG. 4 shows isobaric chamber 112 used to recover hydraulic energy from high pressure brine to pressurize a feed stream. Isobaric chambers and how they function is well known in the art and will not be disclosed in detail herein.

Inherent hydraulic characteristics of isobaric chambers include that the HP feed pressure exiting the unit is slightly lower than the HP brine pressure. Also, the volume of HP brine that enters the isobaric chamber equals the amount of HP feed exiting the isobaric chamber excepting leakage. It is critically important that the HP brine pressure is always higher than the HP feed pressure. Likewise, feed charging to purge brine from the pumping cylinder requires that the feed pressure be greater than brine pressure leading to the drain.

FIG. 4 shows prior art that use an isobaric chamber 112 energy recovery device and a booster pump 110 in an RO system. Isobaric chamber 112 accepts high pressure brine from membrane 10 through pipe 16 and discharges brine at low pressure through pipe 17 to drain 6. Control valve 8 regulates brine flow. Feed enters isobaric chamber 112 through pipe 150 at the same rate as brine flow entering isobaric chamber 112 through pipe 16. Feed exits isobaric chamber 112 through pipe 148 through pump 110 to pipe 4. The combined flow of HPP 2 and isobaric chamber 112 enters membrane 10. Pump 110 typically provides a 2 to 4 bar pressure boost.

FIG. 5 shows prior art that uses isobaric chamber 112 that receives brine from second membrane 15. This configuration uses interstage pump 7 to raise pressure between first and second membranes 10 and 15. As noted above, isobaric chamber 112 discharges feed through pipe 148 at a pressure 2 to 4 bar lower than brine pressure in pipe 16. Typically, brine pressure in second membrane 15 is about 25 bar higher than feed to first membrane 10. Subtracting a maximum of 4 bar for losses in piping and second membrane 15 yields a feed pressure 21 bar higher in pipe 148 than needed for membrane 10. The excess pressure must be directed or wasted by control valve 149. This represents a large loss of energy that could have otherwise been recovered for a useful purpose.

SUMMARY OF THE INVENTION

A system is designed to recover energy from a fluid processing operation that uses membranes to remove impurities from a feed stream. Energy recovery devices, such as turbochargers, an isobaric chamber and a multistage pump are utilized to recover the energy.

DESCRIPTION OF THE DRAWINGS

FIG. 2.1 is a side elevational view.
FIG. 2.2 is a side elevational view.
FIG. 4.1 is a side elevational view.
FIG. 7A is a partial side elevational view.
FIG. 14 is a flow chart diagram of the operating parameters.
FIG. 15 is a flow chart diagram of the operating parameters.
FIG. 16 is a flow chart diagram of the operating parameters.

DESCRIPTION OF THE INVENTION

The invention is directed to an energy recovery system. In particular, the system utilizes turbochargers, an isobaric chamber and a multistage high-pressure pump to achieve the desired energy recovery results.

Figure 5:
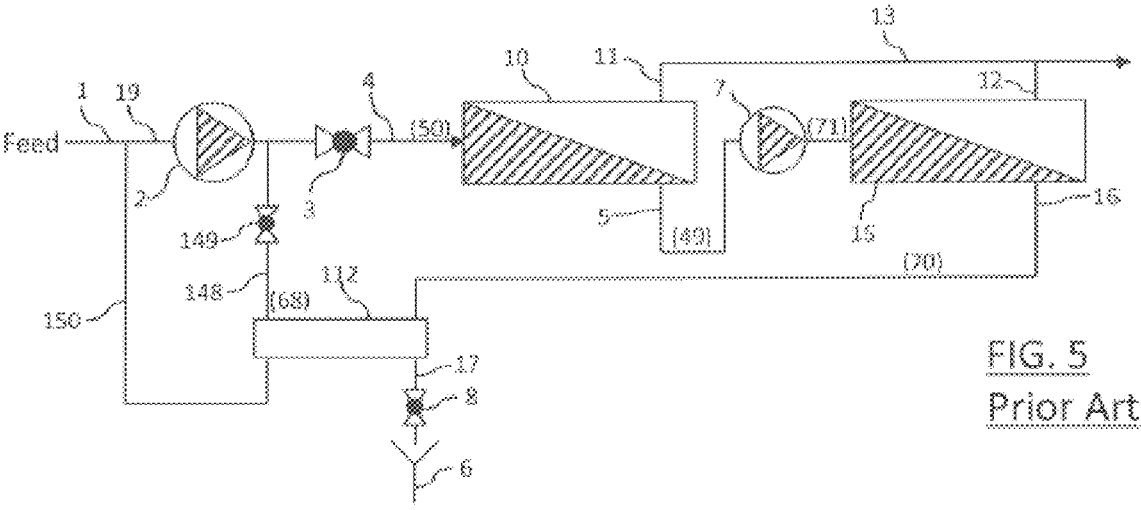
FIG. 5 is a side elevational view.
Figure 6:
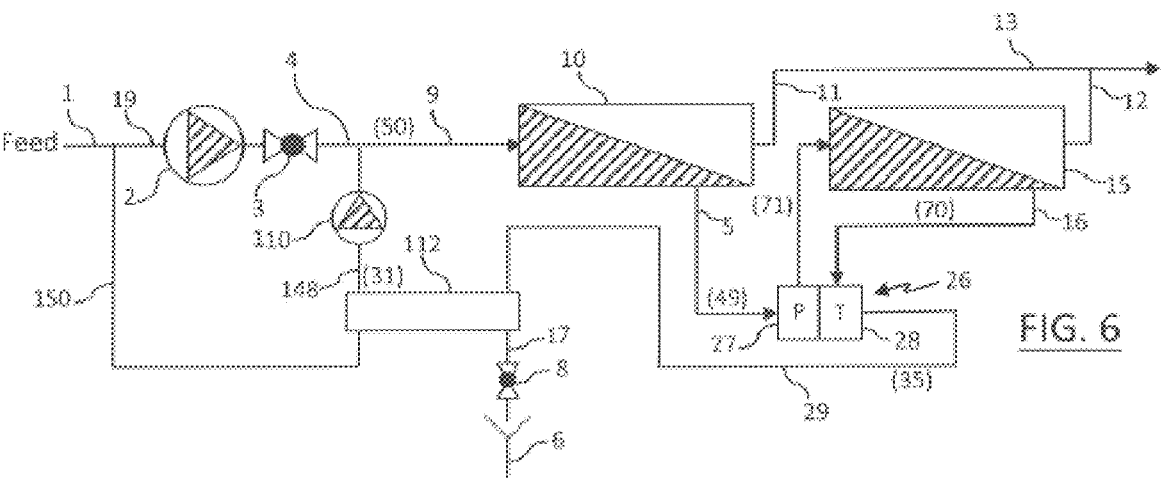
FIG. 6 is a side elevational view.

FIG. 6 shows the first embodiment of the invention. The essence of the invention is to reduce brine pressure exiting membrane 15 to a value below the feed pressure for membrane 10 without wasting available brine hydraulic energy. Thus, the inherent hydraulic characteristics of isobaric chambers will not result in excessive feed pressure that must be wasted or removed from the system by a control valve as described with regard to FIG. 5.

To better understand operation, assume that feed pressure in pipe 9 is 50 bar, brine pressure in pipe 16 is 70 bar and brine pressure in pipe 29 is 35 bar. The pressure in pipe 29 is as a result of the pressure drop created by the use of fluid pressure in turbine section 28 of turbocharger 26 relative to the input pressure in pipe 16. Pressures are included parenthetically for clarity in FIG. 6.

Turbocharger 26 provides a pressure boost from 49 bar to 71 bar between first and second membranes 10 and 15. Partially depressurized brine exits turbine section 28 of turbocharger 26 at 35 bar and passes through pipe 29 to isobaric chamber 112 at 35 bar. Isobaric chamber 112 will discharge feed at a pressure of 4 bar lower. Pump 110 needs to increase pressure of the feed supplied to pipe 9 by 19 bar to match the 50 bar requirement for membrane 10. The main advantage of this embodiment is the elimination of wasted energy from feed throttling by valve 149 in FIG. 5 and elimination of the cost, complexity and energy consumption of motor-driven interstage booster pump 7.

The advantage of this embodiment is the simultaneous utilization of brine energy to provide interstage pressure boosting and reduction in brine pressure to allow an isobaric chamber to operate without producing excessive feed pressure.

Note that pump 110 has a high differential pressure that requires a large motor, variable frequency drive (VFD), high pressure mechanical seal and heavy duty bearings to accommodate operation with a high inlet pressure. Such a pump has a high capital cost, high maintenance and limited efficiency. The next feature of the invention eliminates the need for this pump.

Figure 7:
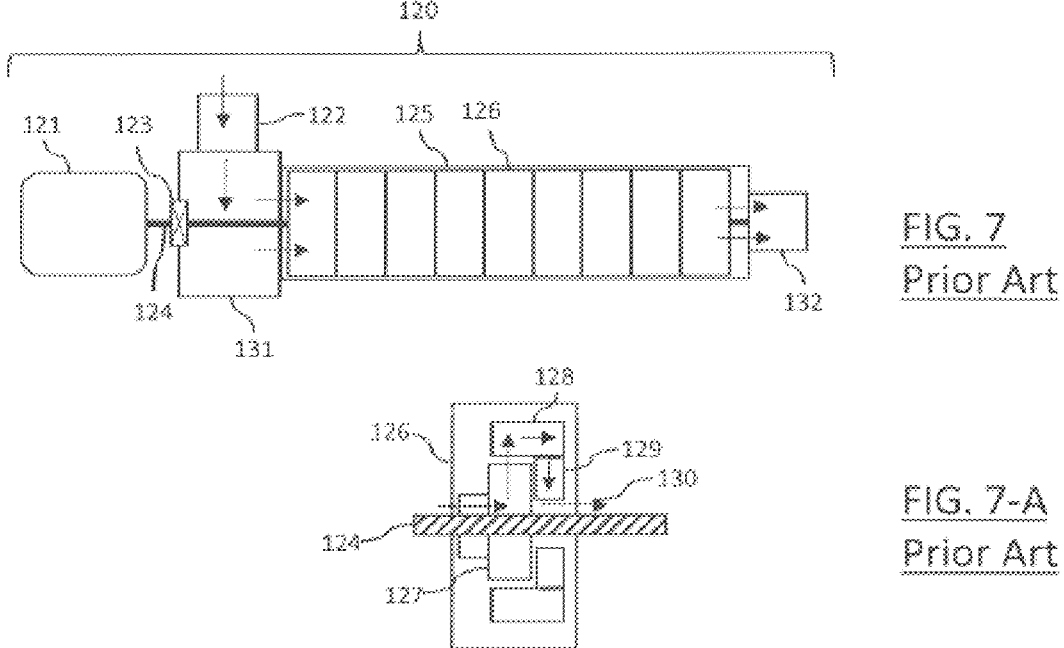
FIG. 7 is a side elevational view.

FIG. 7 shows prior art of multistage high-pressure pump 120 typically used in RO systems. Pump casing 125 of pump 120 contains stages 126 stacked in a series arrangement. Low pressure feed enters through inlet port 122 in inlet housing 131 then passes into the stage array. Each stage adds pressure to the flow as it progresses from stage to stage. Feed exits pump 120 through outlet port 132. Motor 121 rotates pump shaft 124. Shaft seal 123 prevents leakage.

Shaft 124 drives impeller 127 in each stage 126 as illustrated in FIG. 7-A. Diffuser 128 converts dynamic pressure to static pressure and return channel 129 directs the flow into the next stage. Arrows 130 illustrate the flow path through the stage.

Figure 8:
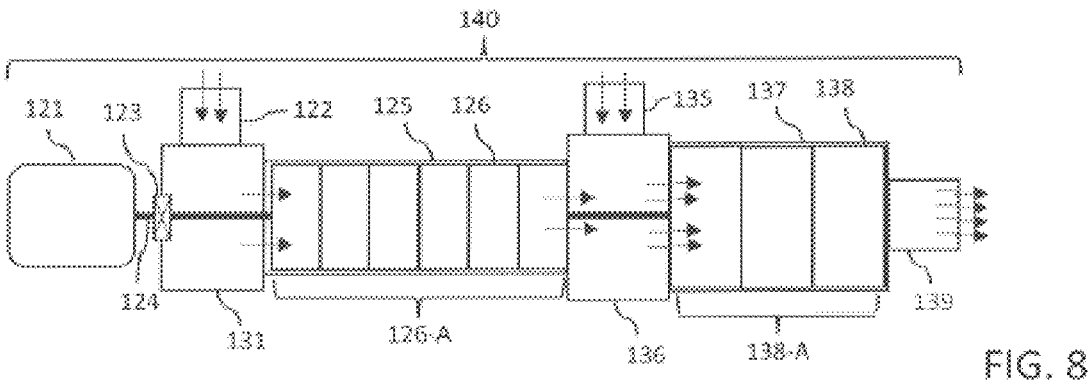
FIG. 8 is a side elevational view.

FIG. 8 illustrates an embodiment of a multistage pump of the invention that overcomes limitations of wasting energy that cannot be recovered and used to provide feed pressure for the first and second membranes, of the previous embodiment. Motor 121 is connected to pump shaft 124. Shaft seal 123 prevents leakage. Feed enters pump 140 through inlet port 122 in first inlet housing 131. Stage stack 126-A generate a specified feed pressure. Second inlet port 135 in second inlet housing 136 accepts additional feed from another source that mixes with feed exiting stage stack 126-A. The combined flow passes into second stage stack 138-A that raises pressure to a specified value and exits through discharge port 139. Note that stages in stage stack 138-A may be larger than stages in stage stack 126-A to accommodate the higher flow.

Figure 9:
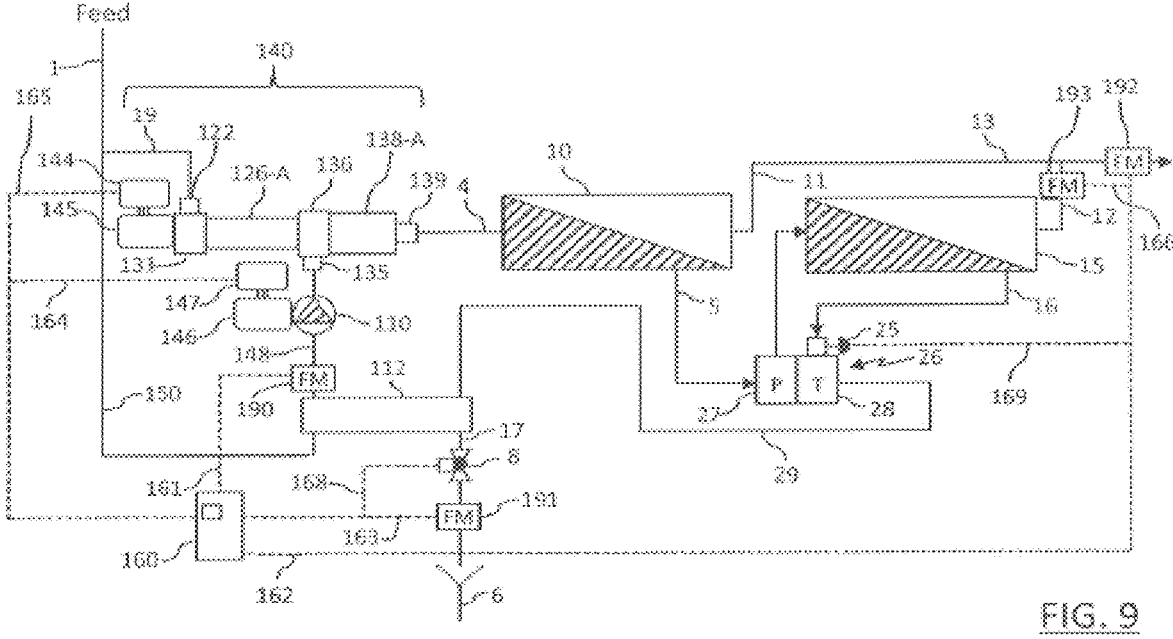
FIG. 9 is a side elevational view.

FIG. 9 shows the functionality of the improved pump 140 within the invention. Feed from pipe 1 enters pump 140 through inlet port 122. Feed pressure is increased to a specified value by stage stack 126-A at inlet housing 136. Feed from pump 110 enters through inlet port 135 and mixes with feed from stage stack 126-A. The combined flow passes through stage stack 138-A to membrane 10 by pipe 4.

Pump 140 through second inlet port 135 receive flow from isobaric chamber 112 that supplies pump 110. The combined flow entering pump 140 through first inlet port 122 and through second inlet post 135 exit through outlet port 139 and passes to first membrane 10 through pipe 4. Motor 145 includes VFD 144 to allow adjustment of pump speed to obtain the pressure required by first membrane 10.

Booster pump 110 with motor 146 and VFD 147 may be needed to provide precise control of pressure from feed outlet pipe 148 of isobaric chamber 112. Note that pump 110 must be rated for operation with high inlet pressure which necessitates an expensive and failure-prone high pressure shaft seal and high-capacity bearings. Booster pump 110 and associated equipment may not be required if precise pressure control at inlet port 135 is not needed.

The integration of turbochargers and isobaric chambers in the same system requires a novel control logic. Control data is provided by flow meter 190 that measures feed flow in pipe 148 that supplies feed from isobaric chamber 112 to pump 140, flow meter 191 that measures brine discharge through pipe 17 and flow meter 192 that measures total permeate flow in permeate header 13. The flow data is processed by PLC 160. PLC 160 controls flow control valve 8 by control line 168, controls VFD 147 by control line 164 and controls VFD 144 by control line 165.

Figure 10:
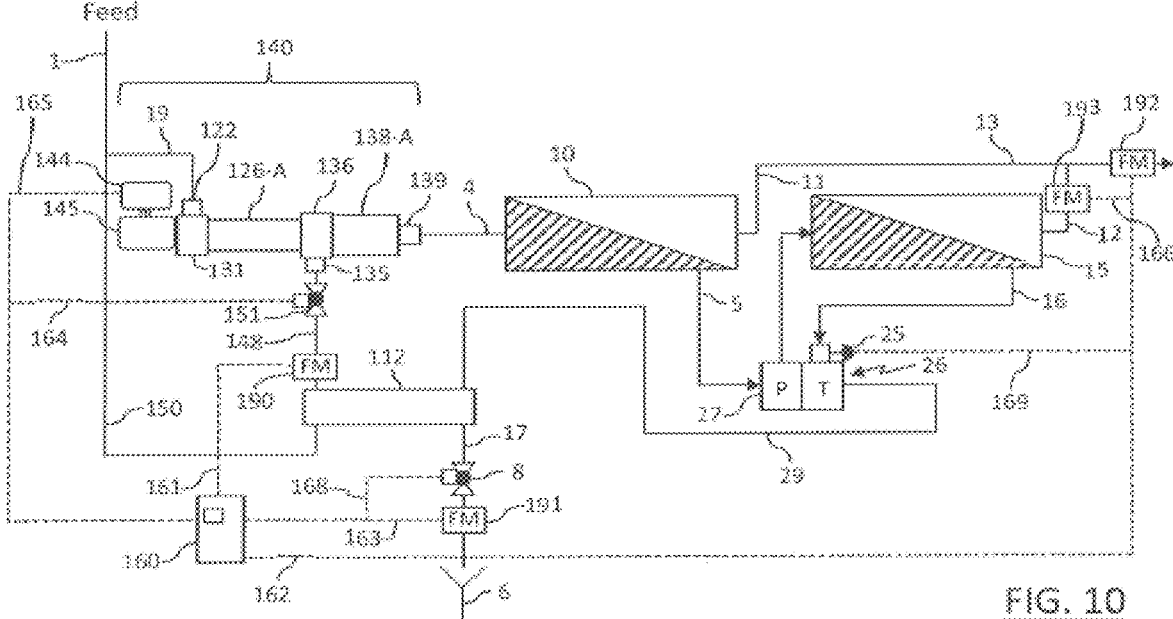
FIG. 10 is a side elevational view.

FIG. 10 illustrates another embodiment that replaces pump 110 and associated equipment with pressure reduction valve 151. Pressure in second inlet port 135 would be designed to be several bar lower than the lowest anticipated for feed discharge pipe 148 of isobaric chamber 112. Adjustment of valve 151 provides regulation of flow. Stage stack 138-A would be designed to provide the pressure required by membrane 10. VFD 144 can be used to adjust the motor speed 145 hence controlling pump discharge pressure at outlet port 139.

The integration of turbochargers and isobaric chambers in the same system requires a novel control logic. Referring to FIG. 10, control data is provided by flow meter 190 that measures feed flow in pipe 148 that supplies feed from isobaric chamber 112 to pump 140, flow meter 191 that measures brine discharge through pipe 17 and flow meter 192 that measures total permeate flow in permeate header 13. The flow data is processed by PLC 160. PLC 160 controls flow control valve 8 by control line 168, controls control valve 151 by control line 164 and controls VFD 144 by control line 165.

Isobaric chamber 112 requires that feed flow through pipe 148 must be equal brine flow through pipe 17. This control functionality also allows adjustment of the brine and feed flows as needed for process control.

Turbocharger 26 is equipped with an auxiliary brine nozzle 25. Opening nozzle 25 increases brine flow and/or reduces differential pressure and closing the nozzle reduces brine flow and/or increases differential pressure. Since brine flow can be held constant by adjusting control valve 8 of isobaric chamber 112, the differential pressure across turbine section 28 is controlled by adjustment of brine nozzle 25. When open, the differential pressure is reduced which reduced pressure boost from pump section 27. Conversely, when closed the differential pressure is increased resulting in greater pressure boost. Permeate production from second membrane 15 increases if pressure boost is higher and decreases if pressure boost is lower. The position of brine nozzle 25 may be set to any value between fully open and full closed to achieve the desired intermediate pressure boost values.

FIG. 14 describes the control logic for the invention.

Figure 11:
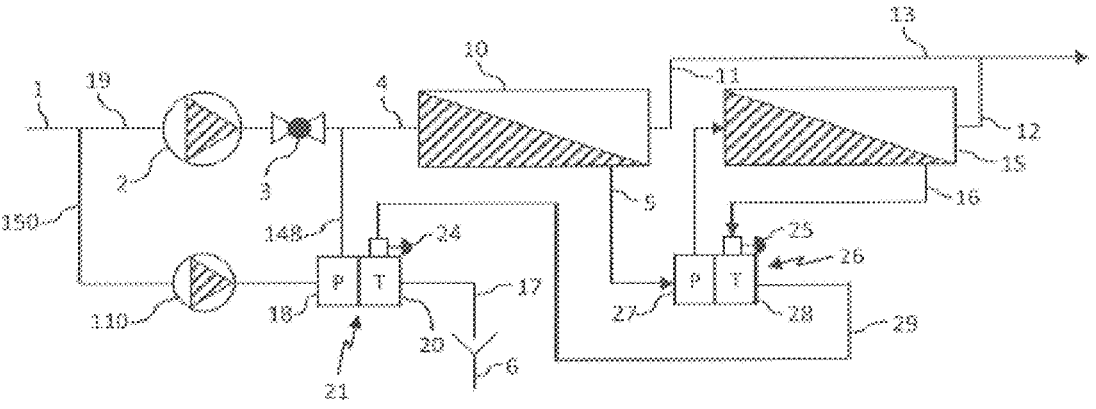
FIG. 11 is a side elevational view.

FIG. 11 shows prior art that uses a turbocharger 21 to functionally replace an isobaric chamber. Turbochargers have many advantages such as higher reliability than isobaric chambers due to a much less complicated design and lower capital cost. A TurboExchanger (TX) 21 replaces the isobaric chamber as described in previous prior art. A notable difference is that booster pump 110 raises pressure upstream of the turbocharger feed inlet compared with pump 110 that is used to raise the pressure downstream of the isobaric chamber feed outlet. Feed enters through pipe 1. A portion of the feed passes through pipe 19 through HPP 2, through control valve 3 to membrane 10. The balance of feed flow passes through pipe 150 through booster pump 110 to pump section 18 of turbocharger 21. Pump section 18 raises the feed pressure sufficient to match the pressure downstream of control valve 3. As previously disclosed partially depressurized brine from turbocharger 26 passes through pipe 29 to turbine section 20 of turbocharger 21, drives pump section 18 and then exits at low pressure through pipe 17 to drain 6.

A significant difference relative to isobaric chambers is that the feed flow through pipe 150 can be greater than, equal to or less than the brine flow through pipe 29. This expands operational flexibility of the system.

Pump 110 requires its own motor, VFD, electrical power supply, baseplate, etc., resulting in significant added capital cost and maintenance costs.

Figure 12:
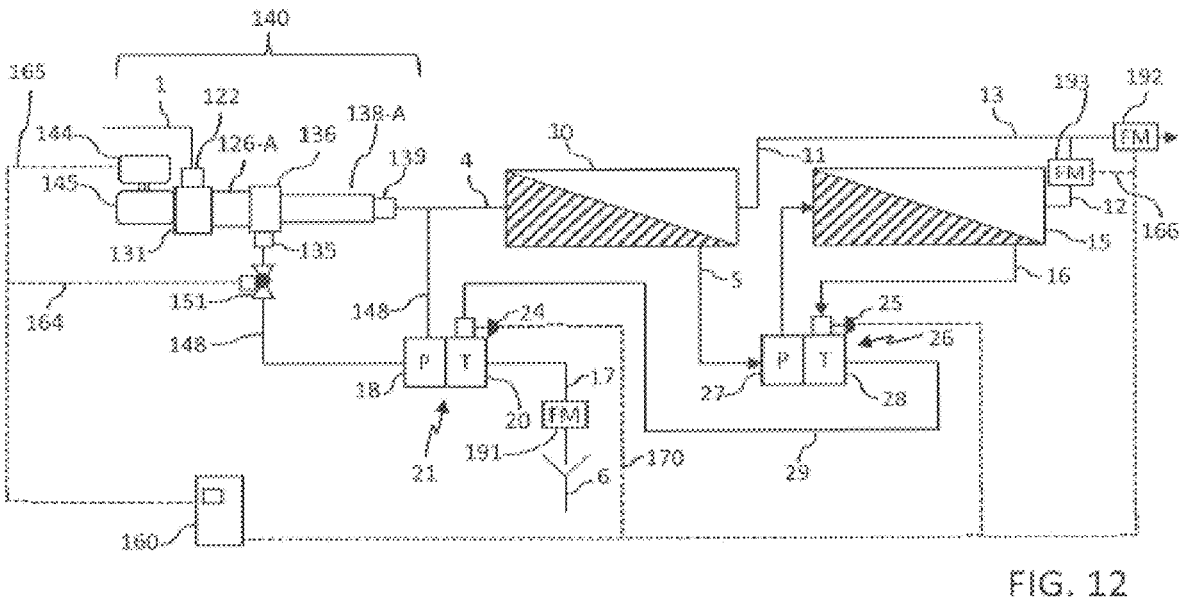
FIG. 12 is a side elevational view.

FIG. 12 shows an embodiment of the invention based on the use of a TX 21. Pump 140 is similar to the previous embodiment with several crucial differences. The total feed flow enters inlet port 122 through pipe 1. Stage stack 126-A raises pressure to slightly higher than required at the feed inlet of pump section 18 of turbocharger 21, ranging from 4 to 8 bar as needed to suppress cavitation in pump section 18 of turbocharger 21. A portion of feed exits pump 140 through outlet 135, passes through control valve 151 to pump section 18 of turbocharger 21. Feed exits the pump section 18 at a pressure that matches the required pressure for membrane 10. Referring to pump 140, feed that does not exit at outlet 135 continues through stage stack 138-A where pressure is increased to match the required pressure for membrane 10. The flows from pump 140 and pump section 18 combine in pipe 4 and enter membrane 10.

Control valve 151 is adjusted to maintain feed flow to the desired value. A PLC 160 is used to control the fluid flow as previously described with regard to FIG. 10.

FIG. 15 defines the control functions for the above embodiment.

Figure 1:
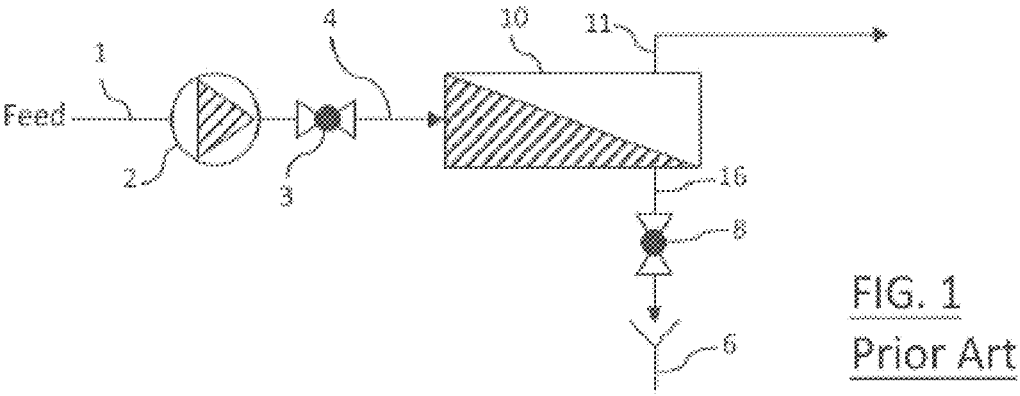
FIG. 1 is a side elevational view.
Figure 2:
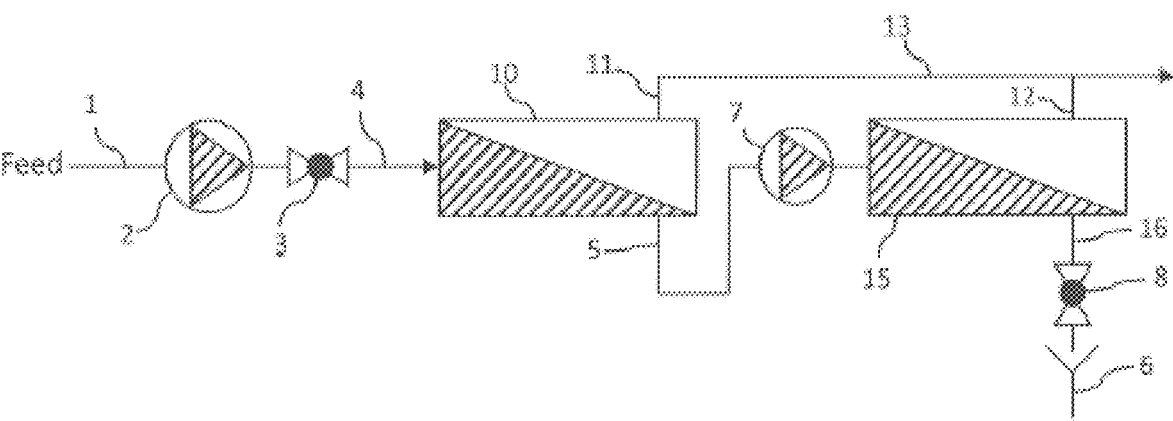
FIG. 2 is a side elevational view.
Figure 3:
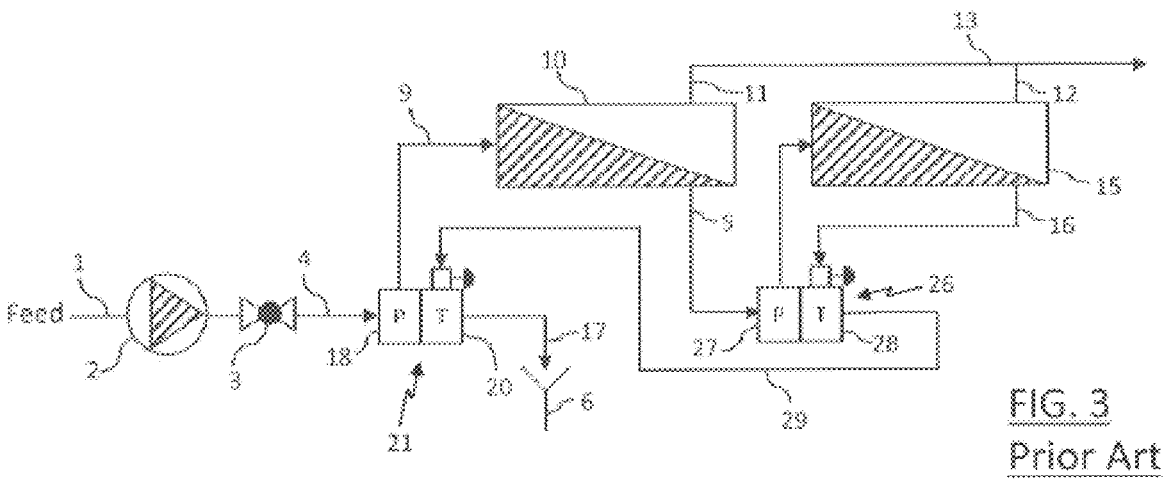
FIG. 3 is a side elevational view.
Figure 4:
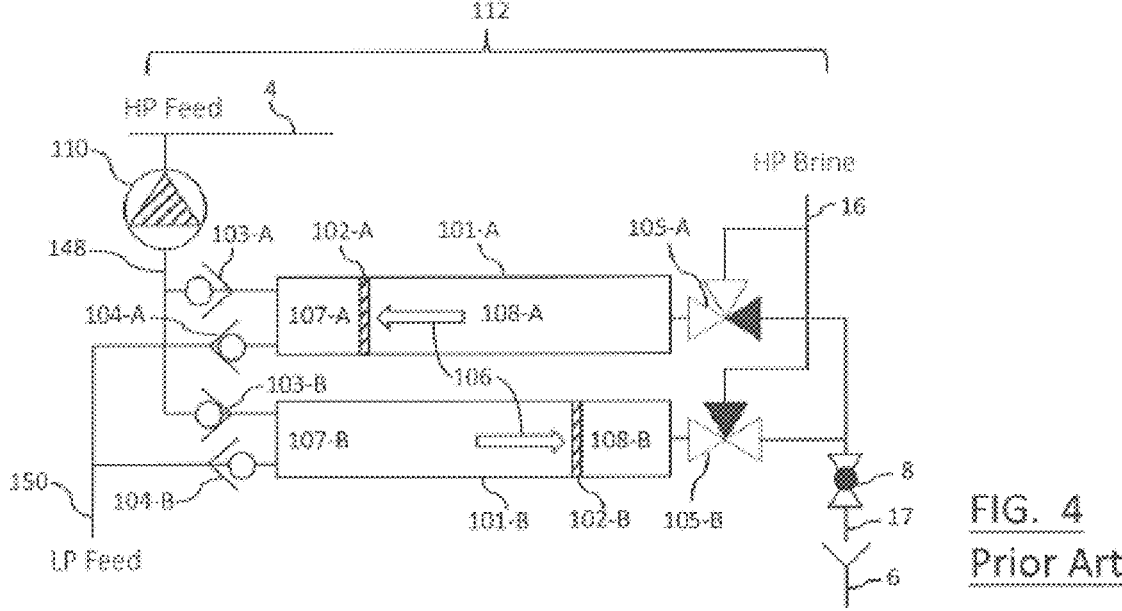
FIG. 4 is a side elevational view.
Figure 13:
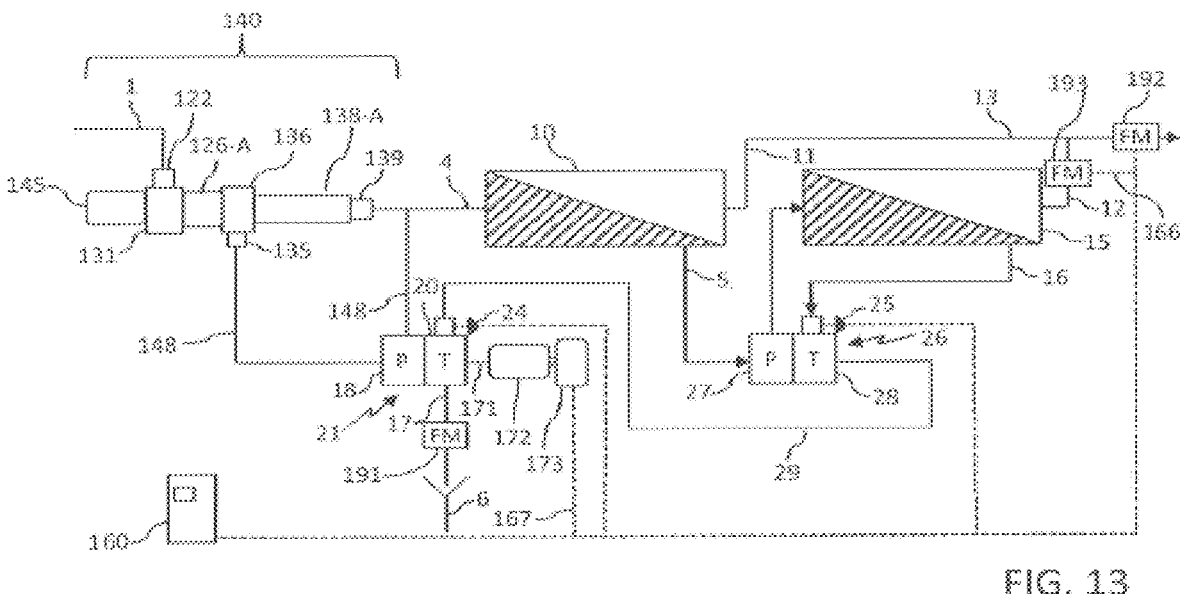
FIG. 13 is a side elevational view.

FIG. 13 shows an embodiment of the invention based on the use of a TX 21 with attached motor 172 and VFD 173. Shaft 171 directly couples motor 172 to shaft 40 depicted in FIG. 2.1. Pressure and flow in pipe 148 is adjusted to match the flow and pressure requirement of membrane 10 by adjusting the rotation rate of shaft 171 via adjustment of VFD 173 driving motor 172. This method of control eliminates valve 151 and the associated wasted hydraulic energy in FIG. 12. Also, pump 140 no longer needs a VFD for speed control, as shown in FIG. 12, as feed flow and pressure regulation is provided by TX 21 with attached motor 172 and VFD 173. Elimination of this large VFD reduces capital costs, maintenance costs and reduces energy consumption by elimination of energy losses that would otherwise occur in the VFD. Note that VFD 173 has about 10% to 15% of the rating of the VFD 144 used with the motor 145 in FIG. 12.

FIG. 16 defines the control scheme for regulation of motor.

The above description is given for the purpose of explaining the invention. Various modifications and substitutions can be made without departing from the scope of the following claims.

I claim:

1. A fluid treatment system comprising:

a first membrane for treating a fluid having an inlet for the fluid to be treated, an outlet for the treated fluid and a discharge opening for untreated fluid;

a source of fluid under pressure to be treated, operatively connected to the inlet of the first membrane;

a multistage feed pump having a first stage stack and a second stage stack, the first stage stack having an inlet port operatively connected to the source of fluid under pressure and an outlet port that is operatively connected to a first inlet opening for the second stage stack, and a second inlet opening in the second stage stack;

a second membrane for treating a fluid having an inlet for the fluid to be treated, an outlet for the treated fluid and a discharge opening for untreated fluid;

a first energy recovery turbocharger having a pump section with a feed inlet and a feed outlet and a turbine section with a brine inlet and a brine outlet, the discharge opening of the first membrane operatively connected to the feed inlet of the pump section, the feed outlet of the pump section operatively connected to the inlet of the second membrane, the discharge opening of the second membrane being operatively connected to the brine inlet on the turbine section;

a second energy recovery turbocharger having a pump section with a feed inlet and a feed outlet, a turbine section with a brine inlet and a brine outlet, the brine outlet of the first turbocharger being operatively connected to the brine inlet on the turbine section of the second turbocharger, the feed inlet on the pump section of the second turbocharger being operatively connected to the second inlet opening in the second stage stack.

2. The system of claim 1 wherein a motor is used to drive the multi-stage feed pump, a variable frequency drive connected to the motor to provide control of the pressure of the fluid supplied to the inlet of the first membrane.

3. The system of claim 2 wherein a motor is connected to the turbine section of the second energy recovery turbocharger, a variable frequency drive connected to the motor to provide control of the pressure of the fluid supplied to the second inlet opening of the multistage pump.

4. The system of claim 3 wherein a first flow meter is operatively connected to the outlet of the first membrane, a second flow meter is operatively connected to the outlet of the second membrane, a third flow meter operatively connected to the discharge outlet of the turbine section of the second energy recovery turbocharger.

5. The system of claim 4 wherein a controller is operatively connected to the first, second, and third flow meters, and to the variable frequency drive for the motor connected to the turbine section of the second energy recovery turbocharger, the controller regulating the flow rate and pressure in the system to achieve the desired pressure for the feed of fluid supplied to the inlets for the first and second membranes.

6. The system of claim 1 wherein a pressure reduction valve is operatively connected to the feed outlet of the pump section of the second turbocharger, the pressure reduction valve regulating the flow of the fluid from the feed outlet.

* * * * *